Aug. 4, 1953  S. J. SPURGEON  2,647,808
BEARING MOUNTING FOR IDLER ROLLS AND THE LIKE
Filed May 19, 1950
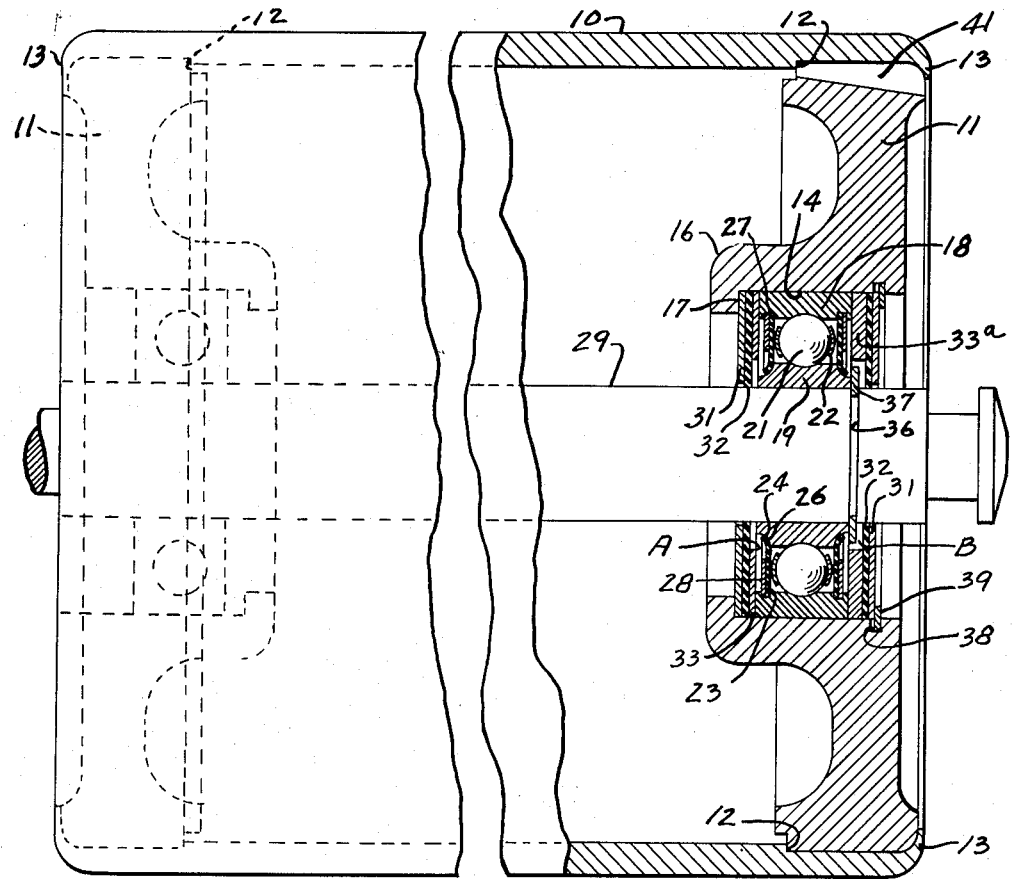
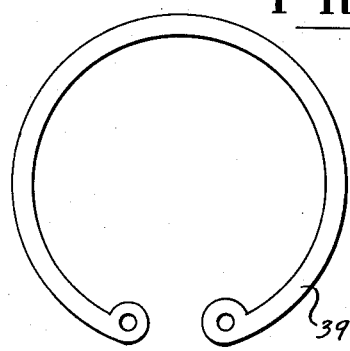
Fig. 3
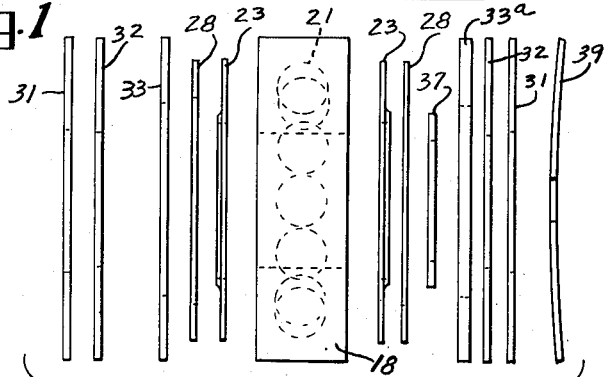
Fig. 2
INVENTOR
SAMUEL J. SPURGEON
BY Jennings & Carter
ATTORNEYS Patented Aug. 4, 1953

2,647,808

UNITED STATES PATENT OFFICE 2,647,808

BEARING MOUNTING FOR IDLER ROLLS AND THE LIKE

Samuel J. Spurgeon, Birmingham, Ala.

Application May 19, 1950, Serial No. 162,980

5 Claims. (Cl. 308—187.1)

My present invention relates to bearing mountings for idler rolls and similar apparatus, and has for an object the provision of a bearing mounting which shall be effective to increase materially the life of an anti-friction bearing of the type having associated therewith one or more seals, for instance, a seal forming a part of the bearing itself.

In seeking to provide an idler roll for belt conveyors which shall have long life I have discovered that the principal cause of failure of an otherwise properly designed and loaded bearing is due to failure of the built-in seals with which the bearings are provided. One of the causes of such seal failure is the presence of deteriorating substances such as abrasive material at the point of rotation of the seal relative to the stationary bearing race. In some instances chemical action of materials being conveyed on the belt are sufficiently deleterious to the seals to cause them to fail. Further, in that type of roll embodying a cylindrical shell and head rolled or welded in each end, I have discovered that differential in air pressure within and without the roll tends to equalize through the bearings, causing egress of lubricant from the interior of the bearings when the air pressure on the outside is lower than the air pressure on the inside. Upon cooling a reversal of this air flow takes place, thereby drawing back into the bearing foreign matter which has accumulated in the lubricant exuded from the seal. Such foreign matter not only attacks the balls, races and spacers of the bearing but also attacks the seals at the point of contact with the stationary race. Thus, in some installations the so-called "sealed" bearings last for only a small fraction of their normal life, though they may still contain sufficient lubricant, and though they may be operated well within their load ratings.

The prime object of my invention is to provide a mounting for a bearing having built-in seals, which mounting shall be effective to protect and prolong the life of the built-in seals, since as indicated I have discovered that so long as the built-in seals remain as good as they are originally no trouble is encountered in a bearing otherwise properly selected for the job at hand.

More specifically, I propose a mounting for a sealed bearing which shall be effective to protect the seals thereof by the provision of secondary or auxiliary seals spaced axially of the sealed bearing, thereby leaving spaces next adjacent the built-in seals of the bearing which may be filled with a suitable semi-fluid material such as lubricant, thus to prevent foreign matter from gaining access to the built-in seals.

My invention further contemplates a mounting of the character designated which shall be effective to hold the auxiliary seals and the bearing against axial displacement relative to the roll and which shall also be effective to hold the roll against axial displacement relative to its supporting shaft or axle.

Another object is to eliminate the above mentioned breathing action through the bearings by providing a passage through a head of the roller or other housing having one closed end and one open end in which the bearing is mounted, whereby air pressure on both sides of the bearing is equalized at all times.

Apparatus illustrating the features of my invention is shown in the accompanying drawings forming a part of this application in which:

Fig. 1 is a fragmental elevational view, with one end in section and showing an idler roll embodying my improved bearing mounting;

Fig. 2 is an elevational exploded view of the bearing together with my improved auxiliary sealing means removed from the hub of the roll; and Fig. 3 is a front elevational view of the locking ring for holding the auxiliary seals and bearing within the bore of the hub.

Referring now to the drawing for a better understanding of my invention I show my improved bearing mounting associated with an idler roll comprising an outer cylindrical shell 10. Mounted in each end of the shell is a head 11. In the manner understood the heads may be pressed into the ends of the shell against shoulders 12 therein, and the outer ends of the shell may be rolled over as indicated at 13, thus to secure the heads in place. In such construction the tight fit of the heads in the ends of the shell 10 together with the forming over of the ends results in substantially sealing the inside of the shell air tight with respect to the outer atmosphere.

Each of the heads 11, which are identical, is provided with a centrally disposed bore 14 in the hub portion 16 thereof. At the inner end of the bore is a shoulder 17. Mounted in the bore of the hub is an anti-friction bearing having an outer race 18, an inner race 19, balls 21 and ball retainers 22. On either side of the balls is a built-in seal comprising a resilient rubber washer or ring 23 having its inner periphery 24 disposed to fit against a curved seat 26 provided on the edge of the inner race 19. The outer circumference of the rubber ring 23 fits in a groove 27 provided in the inner surface of the outer race 18. Also fitting in the groove 27 to bear against the outer surface of the sealing ring 23 is a thin metal washer 28. The inner race 19 is pressed on a centrally disposed roll supporting axle 29, it being understood that the axle 29 is held against rotation in suitable supporting framework. While I illustrate herein a particular form of built-in seal for the anti-friction bearing my invention is equally applicable to other types of bearings as will hereinafter appear.

The above described construction is old in the art and as such forms no part of my invention. My invention consists in the provision of the auxiliary seals together with the means for holding the seals and bearing within the bore 14 of the hub, means for holding the roll against axial movement relative to the axle, and means eliminating the objectionable breathing action through the bearing, all as will now be described.

In the bore of the hub and adapted to bear against the shoulder 17 is a metal washer 31 having a bore slightly larger than the diameter of the axle 29. Next adjacent the washer 31 is a sealing ring or washer 32 formed of resilient material such as rubber or the like. The outer diameter of the ring or washer 32 is slightly larger than the inner diameter of the bore 14. The inner diameter thereof is a fraction larger than the diameter of the roll axle 29, thus to provide a close running fit about the axle. Next adjacent the inner side of the resilient ring 32 is another metal washer 33, similar to the washer 31 except that its central opening is large enough to clear the end of the inner race 19.

On the outer side of the anti-friction bearing are similar sets of steel washers 31 and a sealing washer 32 adjacent the inner side of washer 32 is a washer 33a, similar to 33 except that it is thicker for a reason presently to appear.

The axle 29 is provided with an annular groove 36. Disposed to fit in the groove 36 is a locking ring 37 which is thinner than the washer 33a. As shown in Fig. 1 the sealing washer 32 at the outer end of the bearing bears against the side of the washer 33a and is held out of contact with locking ring 37. The outer diameter of washers 32 provide fixed seals at the point of contact with the bore 14, while the inner diameters coact with the axle 29 to provide sliding seals. It will be apparent that the locking ring 37 holds the anti-friction bearing against movement axially of the axle, thus holding the entire roll against axial movement.

In the bore of the hub portion 16 I provide an internally disposed groove 38. Fitting within the groove 38 is a locking ring 39. As best shown in Figs. 2 and 3 the locking ring 39 is bowed as viewed in plan. The groove 38 is slightly wider than the ring 39, and consequently when assembled in the manner shown in Fig. 1 the entire auxiliary seal arrangement and the bearing are held resiliently assembled by spring pressure of the ring 39 backed up by the shoulder 17.

From a consideration of Fig. 1 it will be seen that due to the spacing of the washers 32, at either side of the anti-friction bearing there are pockets or annular spaces A and B. These spaces may be filled with a suitable material such as lubricant whereby there will always be in contact with the outer surface of the sealing ring 24 a supply of material which lubricates the curved or contacting end 26 thereof. Therefore, when the roll is in operation conveying such material as fine, abrasive coal and the like, such abrasive material is effectively excluded from contact with the inner periphery 26 of the built-in seals of the anti-friction bearing.

In order to eliminate the breathing effect through the bearing as heretofore mentioned I provide a vent opening in the form of a passage 41 in one of the heads so that the inside of the roll is in communication with the atmosphere at all times, thus effectively equalizing the pressure on both sides of the bearing assembly.

From the foregoing it will be apparent that I have devised an improved mounting for bearings and the like which is fully effective for its intended purposes. In actual practice I have discovered that an idler roll equipped with my improved bearing mountings has far greater life in many installations than the conventional mountings. In one case in which abrasive fine coal was conveyed I have found that idler rolls equipped with unprotected "sealed" bearing fail within a very short time. When equipped with my improved auxiliary seal such rolls were operated for months without any difficulty. When such bearings were disassembled I was unable to detect any wear or abrasion of the built-in seal and I found no foreign matter in the bearings. I have found that the lubricant in the spaces A and B, being always in contact with the relatively narrow edge of the inner periphery of washers 32, prevents damage to the same adjacent the axle.

While I show means for venting the inner sealed end of a bearing disposed in the bore of a hub in turn formed in the head of an idler roll, it will be apparent that this principle may be utilized in various kinds of bearing mountings. By way of illustration, the beneficial results of equalizing air pressure on both ends of a bearing may be obtained in those types of outboard bearing mountings which embody a cup-like housing in which the outer race of the bearing is pressed. In this instance venting may be accomplished by providing a small hole in the closed end of the housing. Therefore, the expression of a "closed housing" or "a housing closed at one end" is intended to include a mounting embodying such a housing. In actual practice I have discovered that by so venting the heretofore closed end of bearings placed in housings the trouble free life thereof is materially increased. Further, this feature in combination with the spaced auxiliary seal means has been found to increase the life of such bearings even more. Still further the provision of the lubricant in the spaces between the ends of the bearing and the auxiliary seals adds considerably more life to the bearings under certain conditions of use.

It will be further seen that my improved locking rings provide a bearing mounting which is extremely simple of manufacture and assembly. By filling the spaces A and B with suitable material, which may be a semi-fluid material having both anti-corrosion and lubricating properties, I am enabled to provide a bearing mounting which has an extremely long life. Likewise, by venting the inside of the roll to the outside air I effectively eliminate breathing through the bearings and consequently deterioration of the built in and auxiliary seals.

While I have shown my invention in but one form, it will be obvious to those skilled in the art that it is not so limited, but is susceptible of various changes and modifications without de-

What I claim is:

1. The combination with a cylindrically bored hub having therein an anti-friction bearing embodying built-in seals at each end and a centrally disposed axle for supporting the hub, of auxiliary seals in the bore at each end of the anti-friction bearing and spaced axially of the built-in seals to provide spaces for receiving quantities of semi-fluid material, said auxiliary seals each comprising a washer of resilient material disposed with a close running fit about the axle, and means in the bore of the hub holding said washers in assembled relation with respect to the bearing.

2. The combination with a cylindrically bored hub having a sealed anti-friction bearing therein and an axle for supporting the hub of an internally projecting shoulder at one end of the bore of the hub, auxiliary seals in the bore at each end of the anti-friction bearing each comprising a pair of metallic washers having between them a washer of resilient material fitting closely about the axle, said metallic washers being of greater internal diameter than the resilient washers, said pairs of washers being spaced axially from the seals of the bearing to provide spaces between the sealing washers and the seals of the bearings, and removable means in the bore of the hub holding the assembly of washers and said bearings against axial movement in the hub bore.

3. The combination with a cylindrically bored hub having therein an anti-friction bearing embodying built-in seals at each end and an axle for supporting the hub, of an internally projecting shoulder at one end of the bore of the hub, auxiliary seals in the bore at each end of the anti-friction bearing and spaced axially of the built-in seals, said auxiliary seals each comprising a pair of metallic washers having between them a washer of resilient material fitting closely about the axle to form a seal, a locking ring on the axle holding the bearing against axial movement, and a locking ring in the bore of the hub holding the auxiliary seals against axial movement in the hub bore.

4. The combination with a cylindrically bored hub having an anti-friction bearing therein embodying inner and outer races with built-in seals at each end thereof and an axle for supporting the hub, of resilient washers in the bore of the hub spaced outwardly of each built-in seal and fitting about the axle with a close running fit, a spacer washer surrounding the axle between the outer end of the outer race and the associated resilient washer and out of contact with the inner race of the bearing, a quantity of lubricant in the space defined between said built-in seals and the resilient washers, and means holding the resilient washers in assembled relation with respect to the bearing.

5. The combination with a cylindrically bored hub having an anti-friction bearing therein embodying inner and outer races with built-in seals at each end thereof and an axle for supporting the hub, of an internally projecting shoulder at the inner end of the bore of the hub, rubber washers in the bore of the hub at each end of the anti-friction bearing, other washers holding the rubber washers spaced from the built-in seals of the bearing thereby providing spaces between the rubber washers and the bearing seals, a quantity of semi-fluid material in said spaces, a locking ring in the bore of the hub holding the several washers against moving out of the hub, and a locking ring contacting the outer end of the inner race and disposed inwardly of the associated rubber washer and holding the bearing against axial movement on the shaft.

SAMUEL J. SPURGEON.

References Cited in the file of this patent

UNITED STATES PATENTS

| Number | Name | Date |
|---|---|---|
| 1,993,519 | Miltenberger | Mar. 5, 1935 |
| 2,054,581 | De Laval-Crow | Sept. 15, 1936 |
| 2,266,300 | Bebinger | Dec. 16, 1941 |
| 2,281,010 | Reynolds | Apr. 28, 1942 |

FOREIGN PATENTS

| Number | Country | Date |
|---|---|---|
| 92,045 | Sweden | Apr. 14, 1938 |
| 340,121 | Great Britain | Dec. 24, 1930 |
| 513,506 | Great Britain | Oct. 13, 1939 |
| 595,397 | Germany | Apr. 11, 1934 |